Nov. 20, 1962     C. V. ALLANDER     3,064,511

METHOD FOR RAPID MOUNTING OF TOOL SETS

Filed June 26, 1957     6 Sheets-Sheet 1

INVENTOR
CLAES VILHELM ALLANDER

BY *Strauch, Nolan & Neale*

ATTORNEY

Nov. 20, 1962 C. V. ALLANDER 3,064,511
METHOD FOR RAPID MOUNTING OF TOOL SETS
Filed June 26, 1957 6 Sheets-Sheet 2

INVENTOR
CLAES VILHELM ALLANDER

BY

ATTORNEYS

Nov. 20, 1962 C. V. ALLANDER 3,064,511
METHOD FOR RAPID MOUNTING OF TOOL SETS
Filed June 26, 1957 6 Sheets-Sheet 3
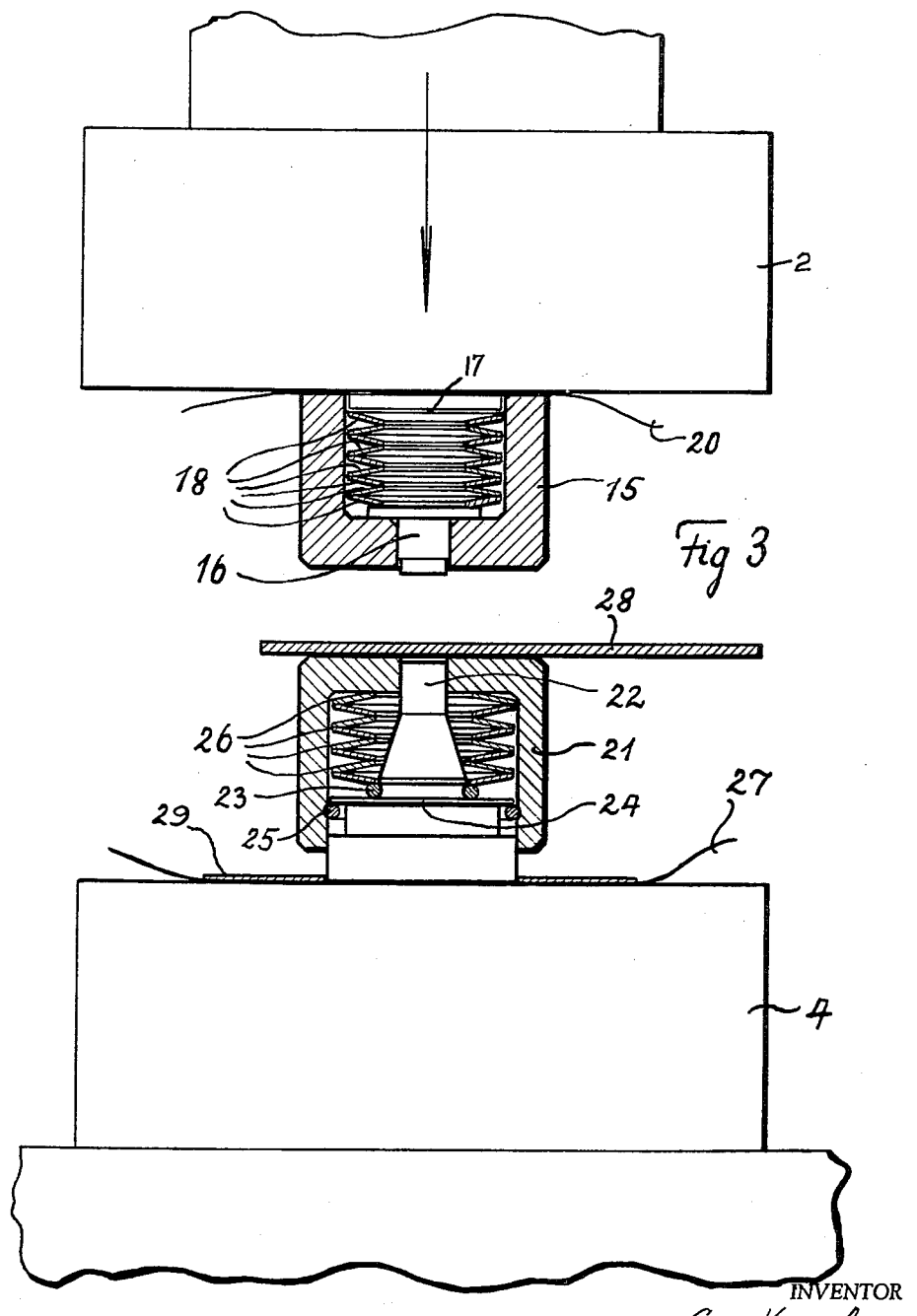

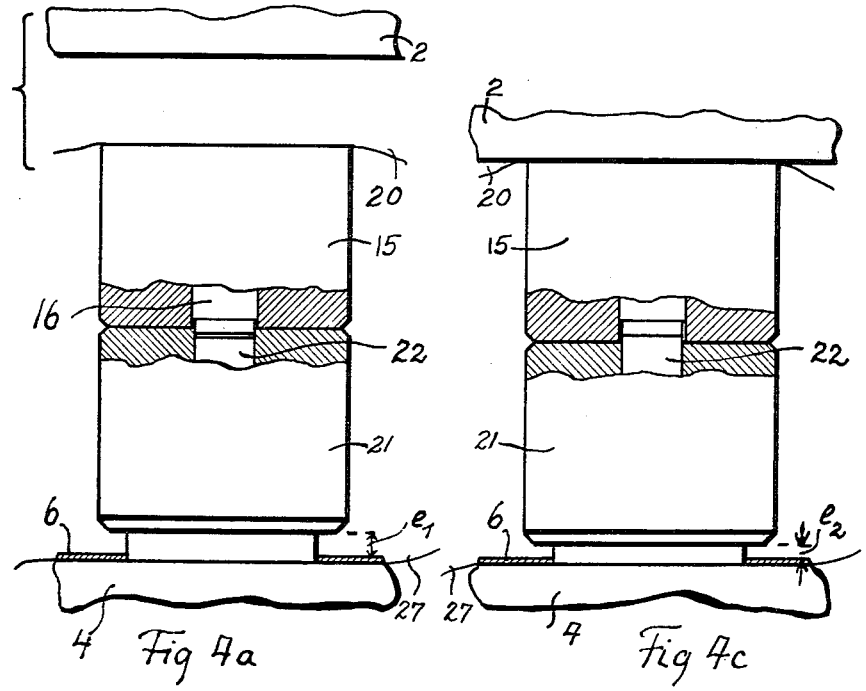
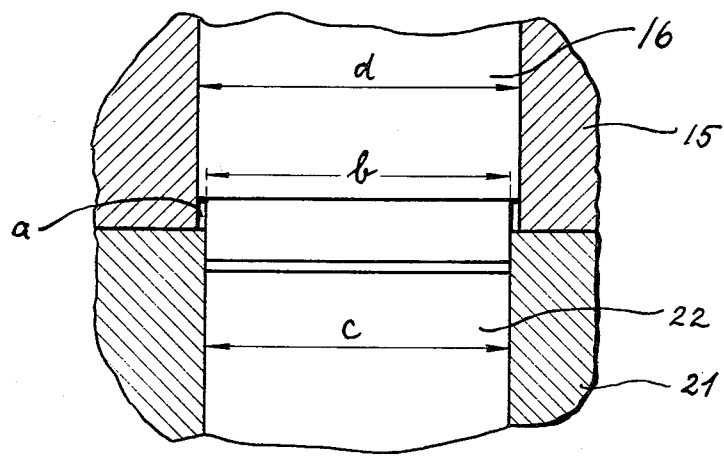

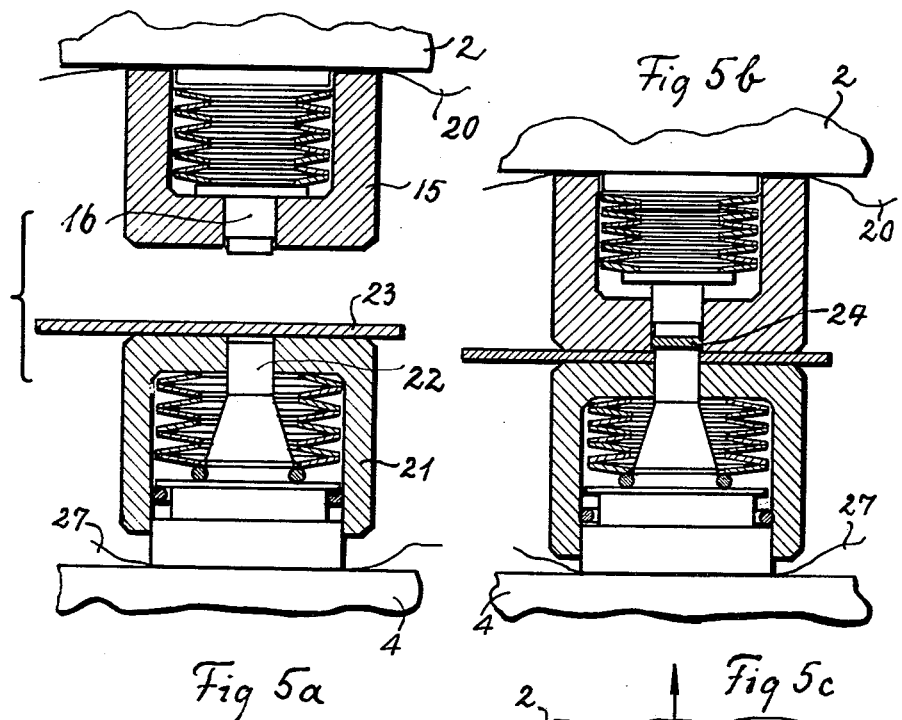
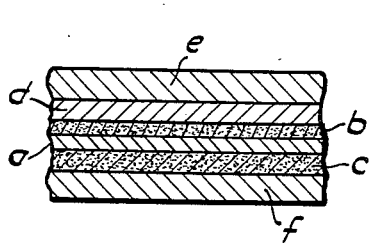
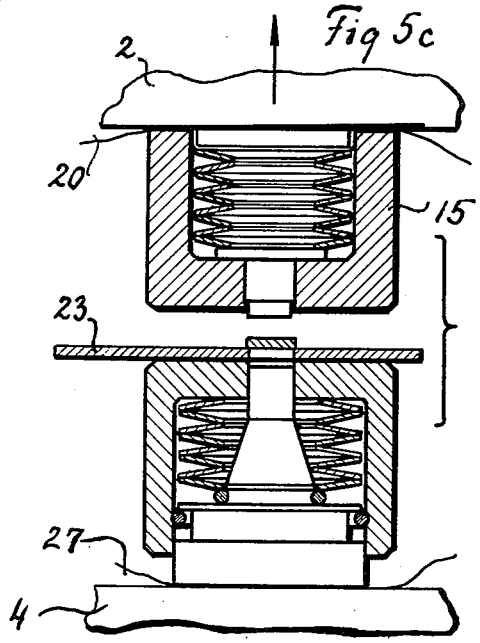

Nov. 20, 1962　　C. V. ALLANDER　　3,064,511
METHOD FOR RAPID MOUNTING OF TOOL SETS
Filed June 26, 1957　　　　　　　　　　　　　　　6 Sheets-Sheet 6
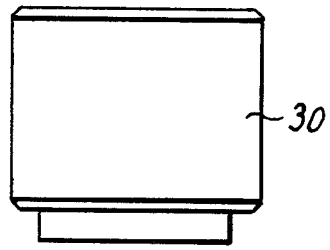
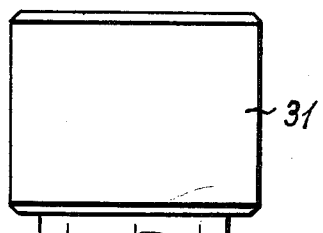
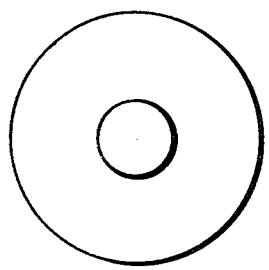
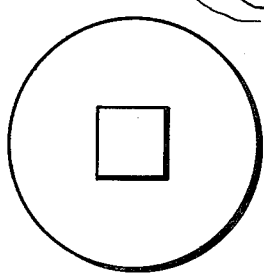
Fig 6　　　　Fig 7
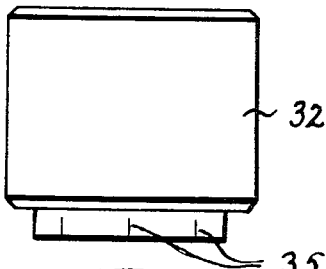
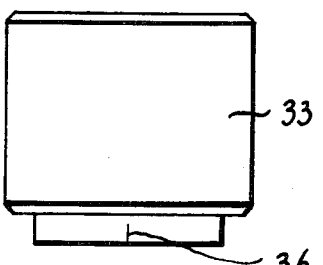
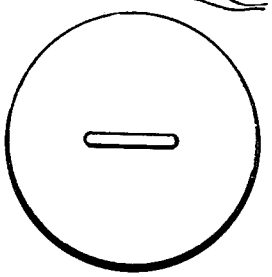
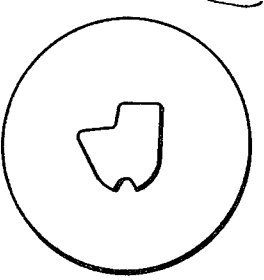
Fig 8　　　　Fig 9
INVENTOR
CLAES VILHELM ALLANDER
BY
ATTORNEYS

United States Patent Office 3,064,511
Patented Nov. 20, 1962

3,064,511
METHOD FOR RAPID MOUNTING OF TOOL SETS
Claes Vilhelm Allander, Riksradsvagen 185,
Johanneshov, Sweden
Filed June 26, 1957, Ser. No. 668,175
Claims priority, application Sweden June 30, 1956
3 Claims. (Cl. 83—13)

The present invention relates to a procedure for rapid tool mounting, and more particularly to methods whereby working tools, such as punches and dies, are mounted at great savings on machine tools for performing punching, drawing, bending, embossing, and like operations.

In many working operations of machine tools, such as punch and like presses, forces of several tons are commonly involved. It has therefore been necessary before this invention to use heavy and often complex fixing attachments to secure the tools or tool halves of the machines to the working parts of such machines, for example to their movable slide plates and fixed working tables. From a point of view of manufacturing, mounting, and inventory, such devices and attachments like tension clasps, bolts and so on represent a significant increase in costs of production when using such machines. Furthermore, for mass production in certain working operations, especially for stamping, punching and drawing of sheet material, multiple tools have commonly been made containing a series of tool units with exact distance between these units in agreement with holes, profiles or other shapes which were desired in a respective sheet material blank. In such cases tolerances are usually of a magnitude of some hundredths of a millimeter. In large volume production, such multiple tools represent very large values. In case of experimental shop manufacture, further costs are incurred due to unproductive waiting periods while a more or less large number of details are manufactured in experimental shops with the aid of more or less basic tools.

By use of the method and means according to the present invention, the above-discussed traditional methods of production of multiple tools for manufacturing a series of cold-worked products are eliminated, up to a certain limit, provided that the blank to be manufactured has a shape which makes it suitable to use the method of this invention.

According to the invention at least one tool is mounted at a desired place on a plate, for instance a press table in a machine tool, at an adhesive surface. A movable part of this machine, for instance a slide plate, is then made to apply pressure against the mounted tool so that the tool clings to the plate, whereafter the blank to be worked is put in between the tool and the upper part of the machine and the working operation is started. The pressure between the tool and adhesive surface is applied by elastic or resilient means, including rubber plates or springs or the like.

For many working operations, tool units are used which consist of two mating tool halves. In that case, the method of this invention is applied in such a way that the mating halves of at least one tool unit are first mounted at a desired place in the machine tool on a plate, for instance a press bed, with one half of the tool on an adhesive surface, that is, between tool and plate. The movable parts of the machine, for instance a slide plate, are thereafter provided with an adhesive surface and perform an elastic pressure movement against the tool unit consisting of two halves and mounted on the plate, preferably during an idle stroke. This causes the outside of the upper tool half to cling to the movable machine part and this tool half thereafter moves with this machine part to its upper stroke position (position of rest), whereafter the material to be worked is placed between the halves of the tool unit or units in the machine and the working operation is started.

Any number of tool units or tool halves can be mounted in this way, as desired. The machine, to which the method is applied, may be any of various kinds, but must be equipped with parallel plates, at least one of which shall be movable, for example to be elevated or lowered, for instance as in eccentric type power presses. For convenience, however, the present invention will be particularly disclosed as applied to a eccentric type punch press with fixed press table and movable slide and head plate.

It is an object of this invention to provide a new method which affords the advantage that tool units can be mounted, removed and exchanged temporarily with complete security without the need to produce expensive permanent multiple tools, or complex mounting attachments. It is a further object to provide such new method which makes it possible to utilize a system of keeping in stock certain standard sizes of tool units of punches, drawing or bending tools, which can be used either separately or be combined to function as a desired multiple tool according to changing requirements.

The economic consequences of the invention are very substantial since the invention eliminates the manufacture of large permanent multiple tools, which often represent a very large expenditure, and these complex tools can be replaced by a stock of individual standard tool units which can be used again continuously. The costs of adhesive films in order to fix and retain tool units on the machine in accordance with this invention is negligible compared to costs of prior type multiple tools, and tool fixing attachments.

The above and other objects and advantages of this invention will be apparent from the following description and appended claims in conjunction with the accompanying drawings, wherein:

FIGURE 1b shows in top plan view an example of a template that can be used with the press shown in FIGURE 1a;

FIGURE 3 shows an enlarged section through an example tool unit for punching in accordance with this invention;

FIGURE 4a shows a side view of the tool unit with the reciprocating press head in upper dead center position (starting position) before the movement thereof to fix the upper half of the tool has been started;

FIGURE 4b shows an enlarged detail of FIG. 4a;

FIGURE 4c shows the tool unit according to FIG. 4a, seen from the side with the reciprocating press head in lower dead center position during the operation of fixing the upper tool half on the press head;

FIGURES 5a to 5c show sections through a tool unit according to FIGURE 3 in three different positions in a press during a hole punching operation;

FIGURES 6 to 9 show four different punching tools with punch holes of different shape; and FIGURE 10 shows an enlarged cross section through a certain type of adhesive tape for use in the method of this invention.

Figure 1B:
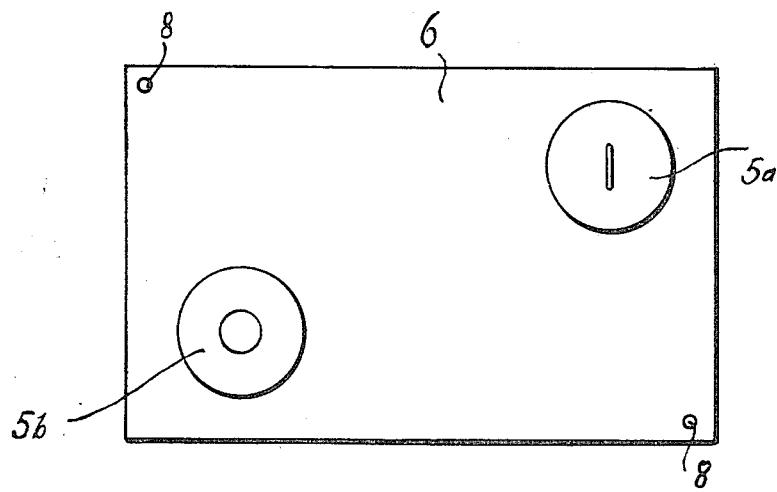
Figure 1A:
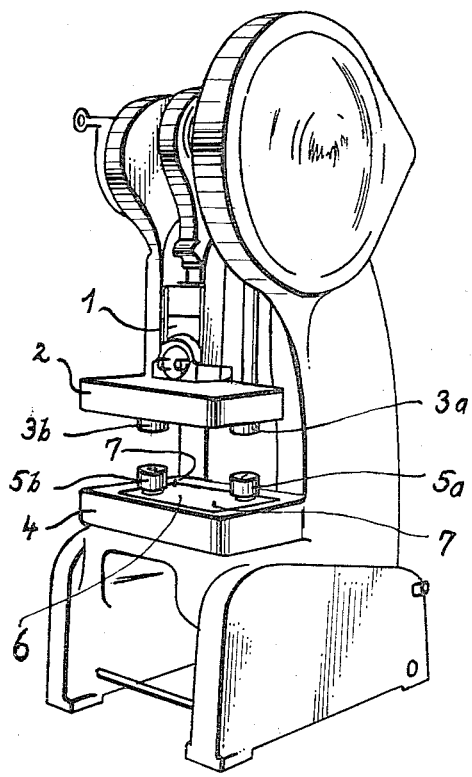
FIGURE 1a shows schematically, and in perspective view, an eccentric type press, in which the method of the invention can be used.

In FIGURE 1a, numeral 1 indicates a movable slide in a standard eccentric power press, and 2 a slide plate fixed on the reciprocating press slide which is shown in upper dead center position (starting position). On the underside of the slide plate 2, two die units 3a, 3b are shown; and on a fixed press table 4 there are shown two punch units 5a, 5b corresponding to the die units 3a, 3b. The punch units 5a, 5b are arranged in holes in a template 6, which is fitted to the press table 4 by means of guide pins 7. The method of centering and mounting the tool units for different cold working methods according to the invention such as for example punching, bending, embossing or drawing is further described below in connection with certain succeeding figures.

FIGURE 1b shows the template 6 with two punch parts 5a and 5b fitted into it and seen from above. The punch 5b has a circular profile and the punch 5a has a notch profile. The holes for the guide pins 7 are designated at 8.

Figure 2B:
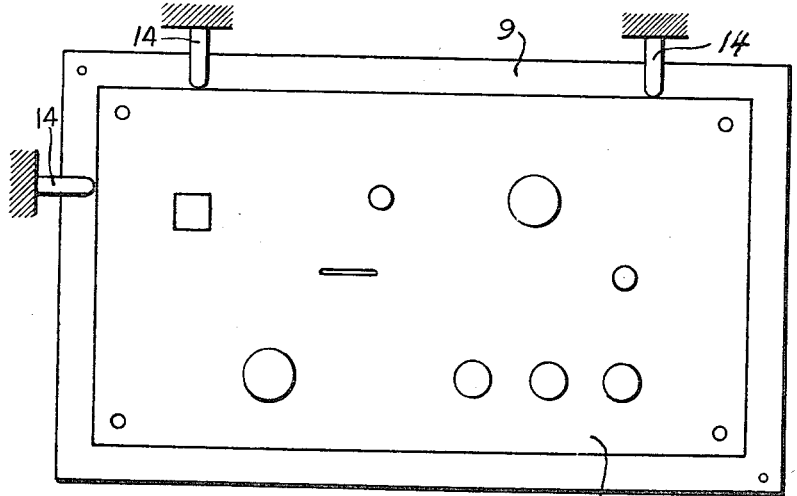
FIGURE 2b shows a blank mounted against locating pins, after treatment in accordance with the invention.
Figure 2A:
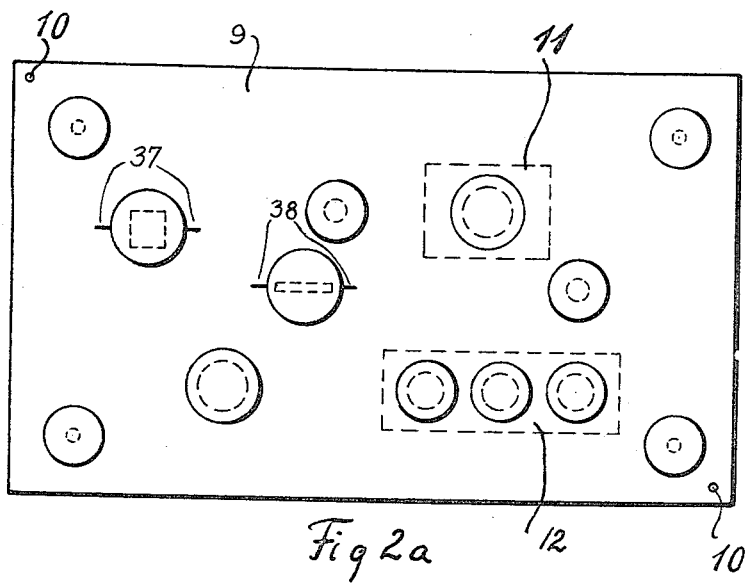
FIGURE 2a shows an example of another template, in top plan view.

FIGURE 2a shows another example of a template 9 provided with thirteen holes placed all over the plates for receiving punching tool units having two different outer diameters and different punching shapes. With dotted lines inside these outer diameters is indicated the shape of the punch tools (in the chosen example, are eleven circular punches with varying diameters, one square punch and one notch shaped punch). The guiding holes of the template 9 are designated 10. At 11 and 12 dotted squares indicate pieces of tape material with adhesive on both sides or films with the same adhesive capacity. The function of these strips is described in more detail in connection with FIGURE 3.

FIGURE 2b shows a blank 13, for example a sheet of iron or of any kind of sheet material such as of metal, plastic, card board, paper or wood, as it appears after finishing a punching operation making thirteen holes in agreement with the punch tools in the template 9 which is shown in FIGURE 2b underneath the blank 13. The blank 13 rests against three fixed or adjustable localizers 14 in the press bed 4 according to FIGURE 1a.

FIGURE 3 shows a section through a tool unit for punching, the slide plate 2 of the eccentric press being in the upper turning position, as in FIGURE 1a. One half of the tool unit consists of a circular hollow punch 15 with a circular ejecting rod 16 in the center. In the interior of the punch 15 a washer 17 is arranged in order to retain a number (in the example, nine) of loose compressible cup springs 18 for ejection. Between the slide plate 2 of the eccentric press and the upper non-working outer surface of the punch 15, there is applied a strip of tape 20 which is adhesive on both sides in accordance with the invention. The other half of the tool unit consists of a circular hollow stripper 21, in the center of which a circular punch 22 is surrounded by a spring ring 23, a washer 24 and another larger spring ring 25 underneath the washer 24. The latter parts, together with loose compressible cup springs 26 (in the example, eight in number) surrounding the said punch 22, keep the punch 22 in non-operative position in relation to the stripper 21. The purpose of the cup springs 26 is to furnish the force necessary to strip off the punched-out sheet material from the punch. Between the lower non-working underside of the punch 22 and the press bed 4 of the press (see FIG. 1a), a tape 27 with double-sided adherence capacity is inserted, and the lower part of the punch 22 is positioned in a template 29 with suitable holes for the tool in question. The blank 28 to be punched rests upon the stripper 21.

Centering and mounting of a punching (or like) tool according to the invention is described in connection with FIGURES 4a to 4c. FIGURES 4a and 4c show a punching tool according to FIGURE 3 in starting position and lower turning position, respectively, of the eccentric press; and FIGURE 4b shows an enlarged view of the working parts of the punching tool in the same position as in FIGURE 4a. For the sake of clearness in this figure, the die is designated 15, the ejecting rod 16, the stripper 21 and the punch 22, in agreement with FIGURE 3. The two strips of adhesive tape are designated 20 and 27 respectively.

In FIGURES 4a and 4c, the slide plate of the eccentric press is designated 2, the press table 4 and the template (in cross section) 6.

The method of mounting tools—in this particular case a punching tool—consists mainly of the following steps:

(1) A template is made with openings (preferably round holes) for tool units consisting of two halves and provided for instance with punches of desired shape, with desired spacing between such openings (for example, as shown in FIGURES 1b, 2a, or in any other way).

(2) On the underside of the template, pieces of double sided adhesive tape are fixed across one hole (as 11 in FIGURE 2a), across several holes (as 12 in FIGURE 2a) or across the entire template. The tape can also be fixed to the press table or directly to the lower part of the punch or die (FIGURE 5a).

(3) The template is mounted, preferably over guide pins on the bed 4 of the press.

(4) Pieces of tape with double adhesive surfaces are applied to that surface of the die (upper die of the tool unit) which faces the slide plate 2 of the press, on desired individual spots on said plate 2, or across the entire surface of that plate.

(5) Depending on the shape of the template, one or more tool units are put into the holes in the template, which overlie a tape between the template underside and the bed of the press.

(6) The eccentric press is started so that the slide plate 2 is lowered from the position of rest (upper dead center position according to FIGURE 3 or 4a), wherein the distance between stripper 21 and the press table 4 is $e_1$, into the lower dead center position (according to FIGURE 4c), wherein the distance between stripper 21 and press bed is $e_2$, so that stripper 21 is thus pressed against the die 15. The force necessary for mounting is produced by the cup springs 26, in stripper 21, being compressed when the press is going down, and is transmitted to the pair of surfaces—die, slide plate as well as punch, press bed—where adherence of surfaces takes place and whereby the two tool halves are fixed respectively to the table and slide plate in rigid working position.

(7) From this lower position as shown in FIGURE 4c the slide plate 2 together with the adherent die 15 is now moved to the upper turning position of the press (position of rest). This position is shown in FIGURE 5a. The tool is now centered in exact working position without any fixing or adjusting devices having been used except for the said adhesive tape.

The tool halves are so dimensioned that there is a radial clearance a between punch and die as shown in FIGURE 4a to 4c which becomes uniform and the halves are thereby correctly centered. This is due to the fact that the knock-out rod 16 according to FIGURE 4b at its active end is provided with an extension having a diameter b which is identical with the diameter c of the punch 22 and of the stripper 21 and that the ejecting rod 16 has an outer diameter d which is identical with the inner diameter of the die 15.

The tool can also be built without extension at the ejecting rod 16. In this case the punch can, for example, protrude into the die and the halves are centered directly, whereby a somewhat different working operation results as the one described below. The clearance between punch and die becomes so small in this case that one becomes more dependent on the thickness and hardness of the punched blank in order to get a satisfactory result.

The tools can, of course, be placed on the plates without using any template, for example along two chosen coordinates.

The succeeding operations are to be seen from FIGURES 5b and 5c. Before punching is started, sheet material 23 is put in between the die and the stripper, as shown in FIGURE 5a.

According to FIGURE 5b, in the punching operation, one hole has been punched in the sheet material 23 and the punch 22 has ejected a circular piece of material 24.

According to FIGURE 5c the slide plate 2 together with the die 15 has returned to the starting position in the upper turning position of the press.

The mounting of the tool halves by means of tape band 20 and 27 respectively remains entirely unchanged as long as the tools and the tape are not removed. The tools can be suitably removed from the tape by a device similar to a pair of pliers or tongs which grip around the outer diameter of the tools for pulling them off. The tools can also be torn off by hand, by means of some scraper, raker, or by a chemical solution, with which the tape is moistened. Pieces of tape for each individual upper or lower surface of a tool can be replaced by whole sheets of tape material of a size corresponding to the entire slide of the tool or the press bed. The use of tape bands makes it possible to mount and remove the tools several times without the need of replacing these tapes, especially when whole sheets of tape material are used.

In order to get a maximum of stability at the working parts, the size of the tool supporting surface in the mounting plane thereof shall be large in proportion to the total height of the tool between the mounting surfaces. In this case elastic elements can also be arranged in the die (when punching) in order to eject waste material when manufacturing openings, depressions or the like of large size in proportion to the size of the supporting surface. Thereby desired proportions can be used to achieve said stability in a simple way and at the same time maintain a practical construction.

In FIGURES 6 to 9 different types of tool halves for punching operations are indicated, seen from the side and from above. In FIGURE 6, a punch unit 30 for circular holes is shown; in FIGURE 7, a punch unit 31 for rectangular holes; in FIGURE 8, a unit 32 for notches with parallel sides and rounded-off ends; and in FIGURE 9 a unit 33 for an arbitrary contour line.

In the cases in which non-circular holes shall be produced in a sheet, graduations or marks must be made, both on the punch and the template, in order to get the punching holes in desired position in the sheet, or the tool halves must be fixed in the correct angular position by other means. Such graduations are indicated at 34 in FIGURE 7, at 35 in FIGURE 8, and at 36 in FIGURE 9. Corresponding graduations (index marks) are indicated at 37 and 38 in the template 9 of FIGURE 2a.

The tape as indicated in FIGURES 2a–5c can either be of a commercially standardized type or be of a different special type adapted to the method of this invention. Before starting the cold working of sheets the lay out of the position of tools on a tape or sheet can be drawn with pencils, steel points or other marking tools.

As shown schematically in an enlarged cross section of FIGURE 10, the tape material can be provided with an innermost core layer a, adhesive layers b and c on respective outer sides, a carbon layer d on one outer side and outer protective layers e and f. After taking off the protective layer e such a band is well suited for marking and making a layout on it of the position of tool halves of a multiple tool installation comprising a number of individual punches or other tools.

The method according to the invention does not in any way necessitate the use of templates such as shown for instance in FIGURES 1b, 2a and others, but the method can be fully carried out by mounting desired tools directly between slide plate and press bed, for instance with or without drawings made up in advance. Drawings which indicate the mutual distances between tools, can be fixed to or reproduced on the press bed and/or the slide plate. It is also possible to use slides or guide rods arranged in rectangular or other coordinates in order to get the desired position of tools. No expensive permanent multiple tools need to be manufactured, but a stock of required tool halves, especially standardized tools for temporary mounting (and taking down after use) can be kept and used an unlimited number of times.

Centering and mounting of tools according to the invention is not limited to the described example showing a method to punch holes, but the new method can be used with great advantage in connection with other plastic (ductile) operations such as drawing, stretching, bending and embossing of sheet material or combinations thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of procedure for immediate, ready to use, rapid die press set up for a press having opposed die carrying members with substantially parallel flat surfaces relatively movable in a direction normal to said flat surfaces, and at least one die set comprising two self aligning cooperating tool parts with substantial areas of flat support surfaces on each tool part arranged with the support area on one tool part being parallel and on the opposite end from the support area on the other tool part when both tool parts are in self aligning engagement, comprising the steps of: selecting a first portion of sheet form double-faced pressure responsive adhesive material of sufficient area to at least substantially completely engage the entire flat support area of said one tool part; placing said first portion of sheet form material on a first one of said press members with one adhesive face in contact with the flat surface of said first press member; placing the flat support area of said one tool part on and in contact with the other adhesive face of said first portion of sheet material; placing the second tool part on the said one tool part with the cooperating parts together to align both of the tool parts and so that the flat base area of the second tool part is facing and parallel with the flat surface of the second press member; selecting a second portion of sheet form double-faced pressure responsive adhesive material of sufficient area to at least substantially completely engage the support area of said second tool part; placing said second portion of sheet material on and with one of the adhesive faces contacting the support area of said second tool part; relatively moving said press members toward each other so the flat surface of said second press member engages with the other adhesive face of said second portion of sheet material; and creating an elastic compression force on the two portions of sheet material and the die set therebetween to cause each of the tool parts of the die set to immediately adhere to their respective press members through the medium of said respective portions of sheet material, as a result of the pressure force.

2. A method of procedure for immediate, ready to use, rapid die press set up for a press having opposed die carrying members with substantially parallel flat surfaces relatively movable in a direction normal to said flat surfaces, and at least one die set comprising two self aligning cooperating tool parts with substantial areas of flat support surfaces on each tool part arranged with the support area on one tool part being parallel and on the opposite end from the support area on the other tool part when both tool parts are in self aligning engagement and said one of the tool parts having a predetermined peripherally walled support base shape, comprising the steps of: selecting a first portion of sheet form double-faced pressure responsive adhesive material of sufficient area to at least substantially completely engage the entire flat support area of said one tool part; placing said first portion of sheet form material on a first one of said press members with one adhesive face in contact with the flat surface of said first press member; selecting a locating template having an opening shaped to receive a predetermined support base peripheral shape of the said one tool part for accurate location of said one tool part within the template opening; placing said template over said first portion of sheet material in accurate location normal to the first surface of said first press member and so that the other adhesive face of said first portion of said sheet material is at least under substantially the entire area circumscribed by the template opening; placing the support base portion of said one tool part in said template opening with the flat support area of said one tool part on and in contact with the other adhesive face of said first portion of sheet material; placing the second tool part on the said one tool part with the cooperating parts together to align both of the tool parts and so that the flat base area of the second tool part is facing and parallel with the flat surface of the second press member; selecting a second portion of sheet form double-faced pressure responsive adhesive material of sufficient area to at least substantially completely engage the support area of said second tool part; placing said second portion of sheet material on and with one of the adhesive faces contacting the support area of said second tool part; relatively moving said press members toward each other so the flat surface of said second press member engages with the other adhesive face of said second portion of sheet material; and creating an elastic compression force on the two portions of sheet material and the die set therebetween to cause each of the tool parts of the die set to immediately adhere to their respective press members solely through the medium of said respective portions of sheet material, as a result of the pressure force.

3. A method of procedure for immediate, ready to use, rapid die press set up for a press having opposed die carrying members with substantially parallel flat surfaces relatively movable in a direction normal to said flat surfaces, and a plurality of separate die sets, each of which comprises two self aligning cooperating tool parts with substantial areas of flat support surfaces on each tool part arranged with the support area on one tool part being parallel and on the opposite end from the support area on the other tool part of the associated die set when both tool parts of the die set are in self aligning engagement, comprising the steps of: selecting a first portion of sheet form double-faced pressure responsive adhesive material of sufficient area to at least substantially cover that portion of flat surface of a press member upon which one part from each of the plurality of die sets is to be mounted; placing said first portion of sheet form material on a first one of said press members with one adhesive face in contact with the flat surface of said first press member; placing the flat support area of one tool part of each of the plurality of die sets on and in contact with the other adhesive face of said first portion of sheet material; placing the second tool part of each of said plurality of die sets on their associated said one tool parts with the cooperating parts together to align both of the associated tool parts of each of said plurality of die sets and so that the flat base area of each of the second tool parts is facing and parallel with the flat surface of the second press member; selecting a second portion of sheet form double-faced pressure responsive adhesive material of sufficient area to at least substantially cover and engage the support areas of all of said second tool parts; placing said second portion of sheet material on and with one of the adhesive faces contacting the support areas of all of said second tool parts; relatively moving said press members toward each other so the flat surface of said second press member engages with the other adhesive face of said second portion of sheet material; and creating an elastic compression force on the two portions of sheet material and the plurality of die sets therebetween to cause each of the tool parts of the plurality of die sets to immediately adhere to their respective press members through the medium of said respective portions of sheet material, as a result of the pressure force.

References Cited in the file of this patent

UNITED STATES PATENTS

| | | |
|---|---|---|
| 198,201 | Kearns | Dec. 18, 1877 |
| 798,530 | Rehfuss | Aug. 29, 1905 |
| 1,801,490 | Falstrom | Apr. 21, 1931 |
| 2,009,660 | Irmis | July 30, 1935 |
| 2,246,795 | Daniels | June 24, 1941 |
| 2,364,834 | Whistler | Dec. 12, 1944 |
| 2,436,342 | Wilcox | Feb. 17, 1948 |
| 2,736,956 | Stahl | Mar. 6, 1956 |
| 2,759,254 | Soehnlen | Aug. 21, 1956 |
| 2,776,008 | Soderman | Jan. 1, 1957 |